US010477117B2

(12) United States Patent
Boyle et al.

(10) Patent No.: US 10,477,117 B2
(45) Date of Patent: *Nov. 12, 2019

(54) DIGITAL CAMERA WITH AUDIO, VISUAL AND MOTION ANALYSIS

(71) Applicant: Acoustic Knowledge, LLC, Dublin, CA (US)

(72) Inventors: Charles A. G. Boyle, Walnut Creek, CA (US); Caleb J. Madsen, Castro Valley, CA (US)

(73) Assignee: Acoustic Knowledge, LLC, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/304,299

(22) PCT Filed: May 30, 2017

(86) PCT No.: PCT/US2017/035076
§ 371 (c)(1),
(2) Date: Nov. 25, 2018

(87) PCT Pub. No.: WO2017/210228
PCT Pub. Date: Dec. 7, 2017

(65) Prior Publication Data
US 2019/0089911 A1  Mar. 21, 2019

Related U.S. Application Data

(60) Provisional application No. 62/342,916, filed on May 28, 2016.

(51) Int. Cl.
H04N 5/272 (2006.01)
G06T 7/20 (2017.01)
(Continued)

(52) U.S. Cl.
CPC ............ H04N 5/272 (2013.01); G06T 7/20 (2013.01); G06T 19/006 (2013.01); H04N 5/04 (2013.01);
(Continued)

(58) Field of Classification Search
CPC .... H04N 5/272; H04N 5/9202; H04N 5/9201; H04N 5/04; H04N 5/772; H04N 5/225;
(Continued)

(56) References Cited

U.S. PATENT DOCUMENTS 8,170,222 B2  5/2012  Dunko
9,959,682 B2  5/2018  Boyle et al.
(Continued)

FOREIGN PATENT DOCUMENTS

JP   2011-521511 A   7/2011
KR  10-2012-0011280 A  2/2012
KR  10-2015-0103723 A  9/2015

Primary Examiner — Twyler L Haskins
Assistant Examiner — Angel L Garces-Rivera
(74) Attorney, Agent, or Firm — TIPS Group

(57) ABSTRACT

A digital camera with audio, visual and motion analysis includes a digital processor, an input processing system, and one or more imaging sensors, sound sensors, and motion sensors. In a non-limiting embodiment, the input processing system including non-transitory computer readable media including code segments, executable by the digital processor, for real-time audio, visual and motion analysis to develop a digital model of an ambient environment of the digital camera from data derived from the imaging sensor(s), sound sensor(s) and motion sensor(s).

25 Claims, 15 Drawing Sheets

(51) Int. Cl.
*G06T 19/00* (2011.01)
*H04N 5/225* (2006.01)
*H04N 5/232* (2006.01)
*H04N 5/77* (2006.01)
*H04N 9/802* (2006.01)
*H04N 9/82* (2006.01)
*H04N 5/04* (2006.01)
*H04N 5/92* (2006.01)
*G11B 31/00* (2006.01)
*G11B 20/10* (2006.01)
*H04N 101/00* (2006.01)
*G06T 7/579* (2017.01)

(52) U.S. Cl.
CPC ......... *H04N 5/225* (2013.01); *H04N 5/23229* (2013.01); *H04N 5/772* (2013.01); *H04N 5/9201* (2013.01); *H04N 5/9202* (2013.01); *H04N 9/802* (2013.01); *H04N 9/8205* (2013.01); *G06T 7/579* (2017.01); *G11B 31/006* (2013.01); *G11B 2020/10546* (2013.01); *G11B 2020/10611* (2013.01); *H04N 2101/00* (2013.01)

(58) Field of Classification Search
CPC .. H04N 9/8205; H04N 9/802; H04N 5/23229; H04N 2101/00; G06T 7/20; G06T 19/006; G06T 7/579; G11B 2020/10611; G11B 2020/10546; G11B 31/006
See application file for complete search history.

(56) References Cited

U.S. PATENT DOCUMENTS

| | | |
|---|---|---|
| 10,204,457 B2 * | 2/2019 | Boyle .................. G06T 7/20 |
| 2012/0027217 A1 | 2/2012 | Jun et al. |
| 2013/0182858 A1 | 7/2013 | You et al. |
| 2014/0277595 A1 | 9/2014 | Nixon et al. |
| 2014/0313303 A1 | 10/2014 | Davis |
| 2015/0016712 A1 | 1/2015 | Rhoads |
| 2015/0062168 A1 | 3/2015 | Ng-Thow-Hing et al. |
| 2015/0109338 A1 | 4/2015 | McKinnon |
| 2015/0141057 A1 | 5/2015 | Papillon et al. |
| 2015/0248792 A1 | 9/2015 | Abovitz et al. |

* cited by examiner

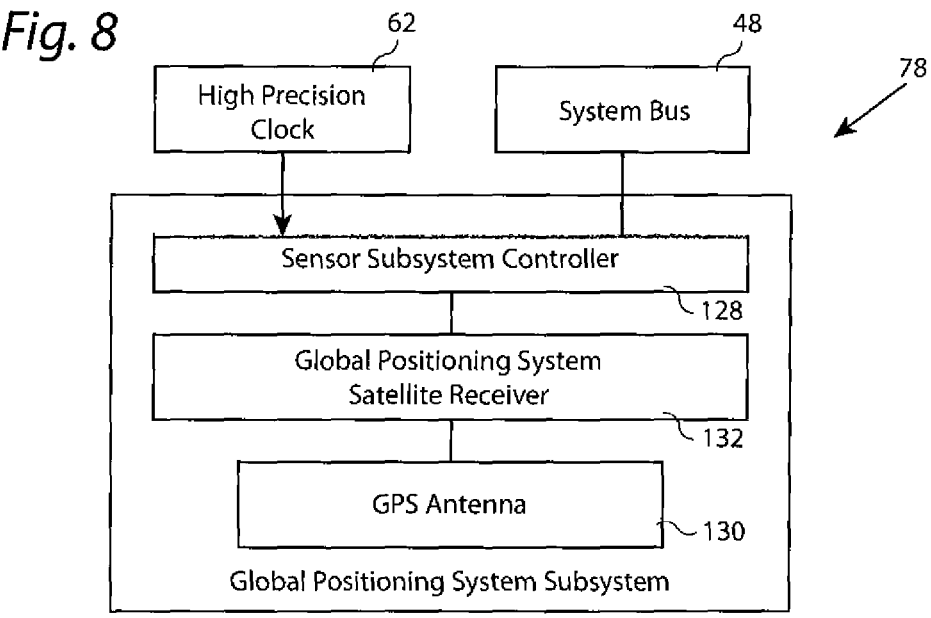
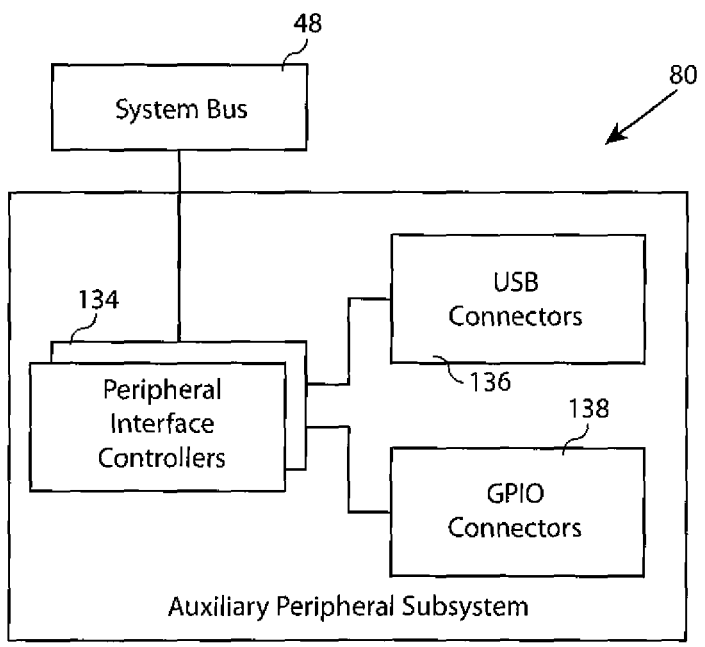

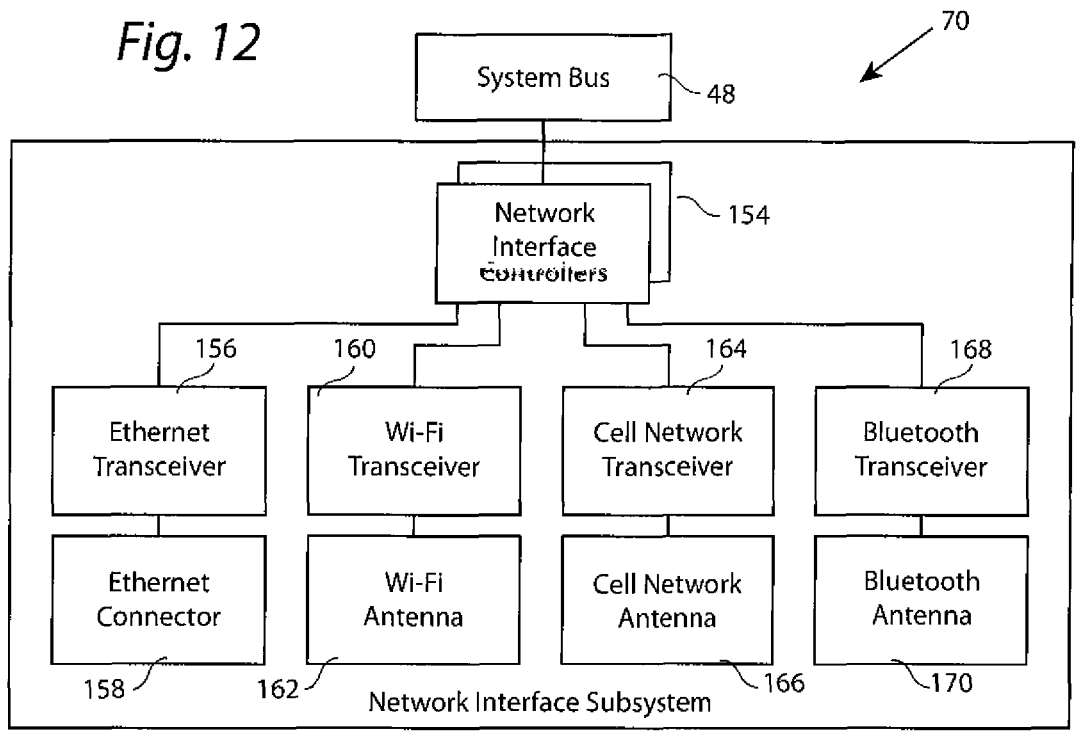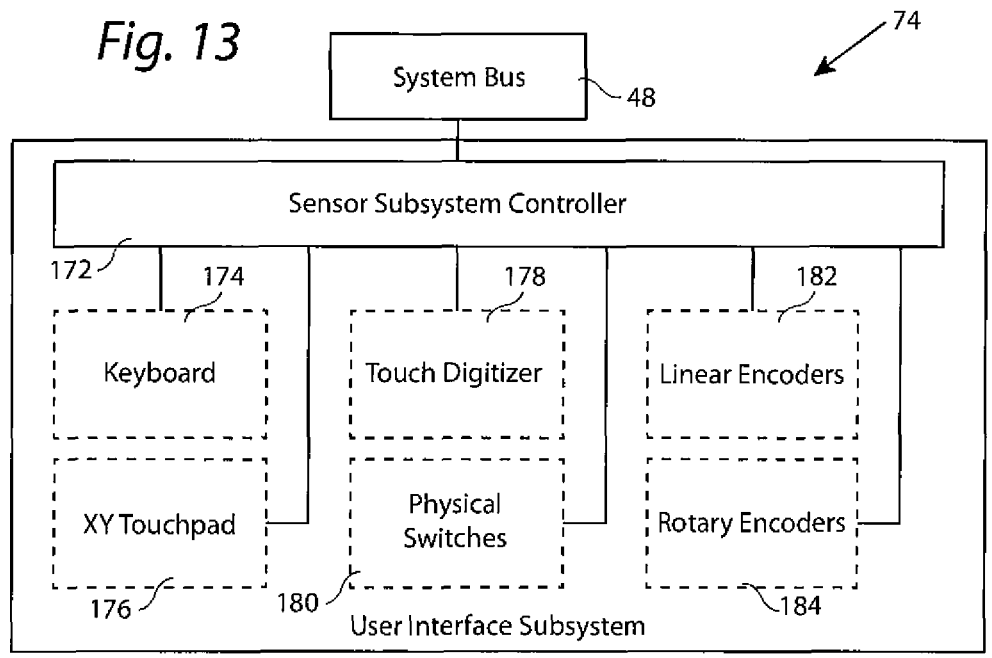

DIGITAL CAMERA WITH AUDIO, VISUAL AND MOTION ANALYSIS

FIELD

This invention relates to digital cameras and, more particularly, to digital cameras with audio, visual and motion inputs.

BACKGROUND

A digital camera is a camera that produces digital images that can be stored in a computer, displayed on a screen and printed. Most cameras sold today are digital, and digital cameras are incorporated into many devices ranging from personal digital assistants (PDAs) and mobile phones (camera phones) to vehicles. Many digital cameras (sometimes referred to as video cameras) can also record moving videos with sound (audio). When built into smartphones, mobile phones, PDAs and laptop computers, digital cameras often store the images in a compressed format because of the relatively high bit rate and large file size of uncompressed video.

Digital and video cameras share an optical system, typically using a lens with a fixed or variable diaphragm to focus light onto an image pickup device. The diaphragm and shutter admit the correct amount of light to the imager, which produces an output that can be processed, stored and displayed. The processing typically includes the production of an RGB image from the digitized output of the imaging device (often a CCD sensor), adjustment for brightness, white balance, sharpness and contrast. Some digital cameras can also perform elementary image editing, such as cropping and stitching pictures.

Digital cameras coupled to powerful computers can allow for augmented reality (AR), which brings components of the digital world into a person's perceived real world. Augmented Reality (AR) is often used synonymously with Mixed Reality (MR) to mean a hybrid reality made by the merging of real and virtual worlds to produce new environments and visualizations where physical and digital objects co-exist and interact in real time.

With some AR systems, a head-mounted display, which tracks the movement of the head, is used to display the AR images. With the help of advanced AR technology (e.g. computer vision and object recognition) the information about the surrounding real world of the user becomes interactive and capable of digital manipulation. For example, information about the environment and its objects can be overlaid on a real world display.

In the context of smartphones, e.g. mobile phones operating on the iOS or Android operating systems, simple AR technology can be implemented using "apps," which are typically downloaded application programs which manipulate the output of the built-in digital camera. For example, Pokémon Go is a location-base augmented reality game developed by Niantic, Inc. of San Francisco, Calif. for iOS and Android devices (e.g. smartphones and pads). However, due to the limited processing power and sensory inputs of a typical smartphone, the positioning and characteristics of virtual objects with respect to the real world imagery tends to be relatively crude.

These and other limitations of the prior art will become apparent to those of skill in the art upon a reading of the following descriptions and a study of the several figures of the drawing.

SUMMARY

Various examples are set forth herein for the purpose of illustrating various combinations of elements and acts within the scope of the disclosures of the specification and drawings. As will be apparent to those of skill in the art, other combinations of elements and acts, and variations thereof, are also supported herein.

In an embodiment, set forth by way of example and not limitation, a digital camera with audio, visual and motion analysis includes a camera body, a lens, an imaging sensor aligned with the lens, a sound sensor, a motion sensor, and an input processing system. In a non-limiting example, the input processing system includes: (a) a system bus; (b) a digital processor coupled to the bus; (c) a sound sensor subsystem coupling an output of the sound sensor to the bus; (d) an imaging sensor subsystem coupling an output of the imaging sensor to the bus; (e) a motion sensor subsystem coupling an output of the motion sensor to the bus; (f) a high precision clock, separate from a system clock, to provide synchronous clock signals to the motion sensor subsystem, the imaging sensor subsystem, and the sound sensor subsystem; and (g) non-transitory digital memory coupled to the bus including code segments, executable by the digital processor, for real-time audio, visual and motion analysis to develop a digital model of an ambient environment of the digital camera from data derived from the motion sensor subsystem, the imaging sensor subsystem, and the sound sensor subsystem.

In another embodiment, set forth by way of example and not limitation, a method for modeling an ambient environment with a digital camera includes: collecting raw input data from a plurality of sensors including, at least, an imaging sensor, a sound sensor and a motion sensor; deriving metadata from the raw input data; and processing the metadata and the raw input data to develop a model of the ambient environment of the digital camera. In some embodiments, the raw input data includes only one of imaging sensor data and sound sensor data.

In a further embodiment, set forth by way of example and not limitation, a method for providing an augmented reality (AR) display on a digital camera includes: scanning an ambient environment with a digital camera including at least an imaging sensor, a sound sensor and a motion sensor; developing a model of the ambient environment with a digital processor of the digital camera that includes physical objects and their properties from data derived from the imaging sensor, the sound sensor and the motion sensor; and developing augmented reality (AR) to overlay the ambient environment. In certain embodiments the AR includes sound, in certain other embodiments the AR includes images, and in still further certain other embodiments the AR includes both sound and images.

In a still further embodiment, set forth by way of example and not limitation, a non-transitory computer readable medium comprising code segments executable on a digital processor of a digital camera for: scanning an ambient environment with a digital camera including at least an imaging sensor, a sound sensor and a motion sensor; developing a model of the ambient environment with a digital processor of the digital camera that includes physical objects and their properties from data derived from the imaging sensor, the sound sensor and the motion sensor; and developing augmented reality (AR) to overlay the ambient environment. In certain embodiments the AR includes sound, in certain other embodiments the AR includes images, and in still further certain other embodiments the AR includes both sound and images.

These and other examples of combinations of elements and acts supported herein as well as objects and advantages thereof will become apparent to those of skill in the art upon a reading of the following descriptions and a study of the several figures of the drawing.

BRIEF DESCRIPTION OF DRAWINGS

Several examples will now be described with reference to the drawings, wherein like elements and/or acts are provided with like reference numerals. The examples are intended to illustrate, not limit, concepts disclosed herein. The drawings include the following figures:

FIG. 8 is a block diagram of an example Global Positioning System Subsystem of FIG. 3;

FIG. 9 is a block diagram of an example Auxiliary Peripheral Subsystem of FIG. 3;

FIG. 12 is a block diagram of an example Network Interface Subsystem of FIG. 3;

FIG. 13 is a block diagram of an example User Interface Subsystem of FIG. 3;

DESCRIPTION OF EMBODIMENTS

Figure 1A:
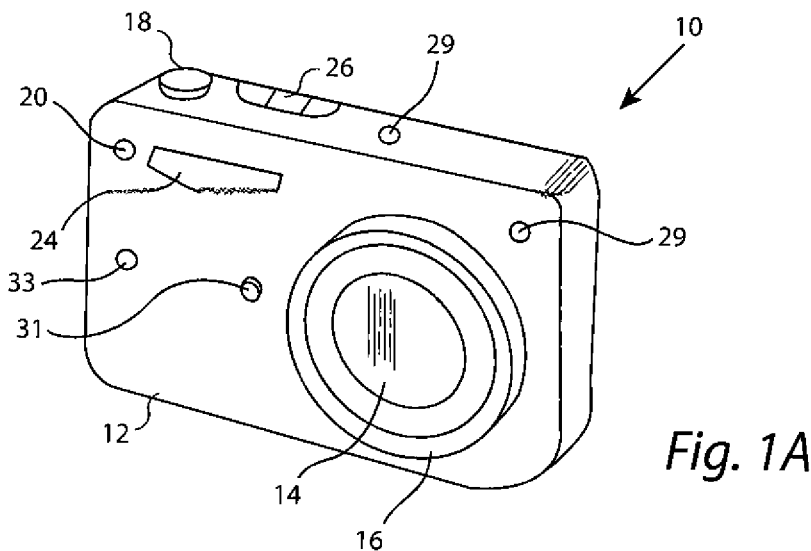
FIG. 1A is a perspective view of the front of an example digital camera.
Figure 1B:
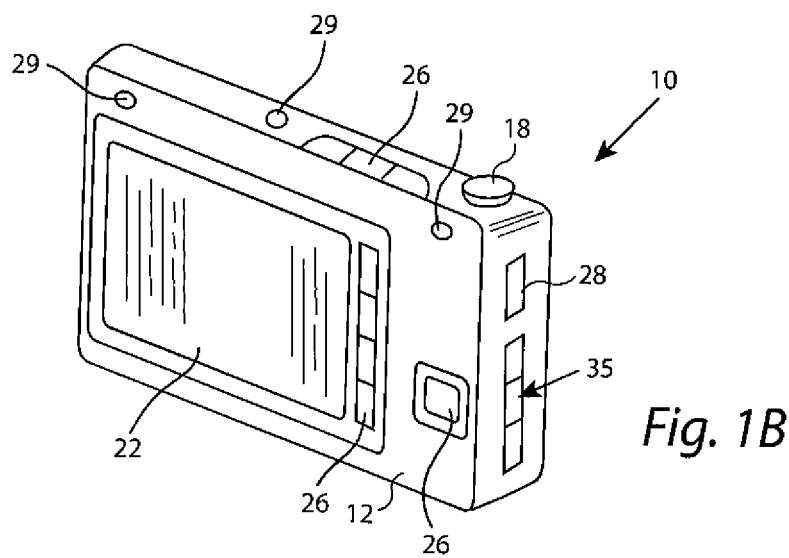
FIG. 1B is a perspective view of the back of the example digital camera of FIG. 1A.

FIGS. 1A and 1B are perspective views of the front and back, respectively, of an example digital camera 10 including a body 12, a lens 14, a telescoping lens barrel (diaphragm) 16, a shutter button 18, a sound sensor (e.g. a microphone) input 20, and a display 22. In this non-limiting example, the digital camera 10 also can include a flash assembly 24, a variety of control buttons 26, and an I/O port, such as a USB port 28. A number of components (not seen) are disposed within the camera body 12, such as an image sensor, analog video circuitry, and an input processing system capable of analyzing and enhancing digital imagery. In certain embodiments, one or more additional sound sensors 29 are provided, e.g. on the front, back, top, bottom or sides of the body 12. Also, one or more additional cameras 31 can be provided, such as wide angle cameras, infrared (IR) thermal imaging cameras, etc. These additional cameras can be useful, for example, in motion tracking. A digital particle velocity sensor 33 can be provided to evaluate the scattering and absorptive properties of materials in the ambient environment. Further I/O ports 35 can also be provided on the body 12 of the digital camera 10 including, for example, a headphone port, a loudspeaker, printer port, video output port, etc.

Digital camera 10, as described herein, is capable of operating both as an ordinary camera capturing still photographs as well as operating as an advanced video camera capable of image analysis, image manipulation, and image augmentation. While generally referred to herein as a digital camera or digital camera system, it will be understood that it can also be interchangeably described as a video camera or video camera system, an augmented reality (AR) system, a virtual reality (VR) system, etc. Digital camera 10 is preferably a unitary device (e.g. not requiring external components or a connection to additional computing power) capable of, for example, computationally intensive audio/visual processing for such purposes as providing real-time augmented reality displays and analysis.

Figure 2:
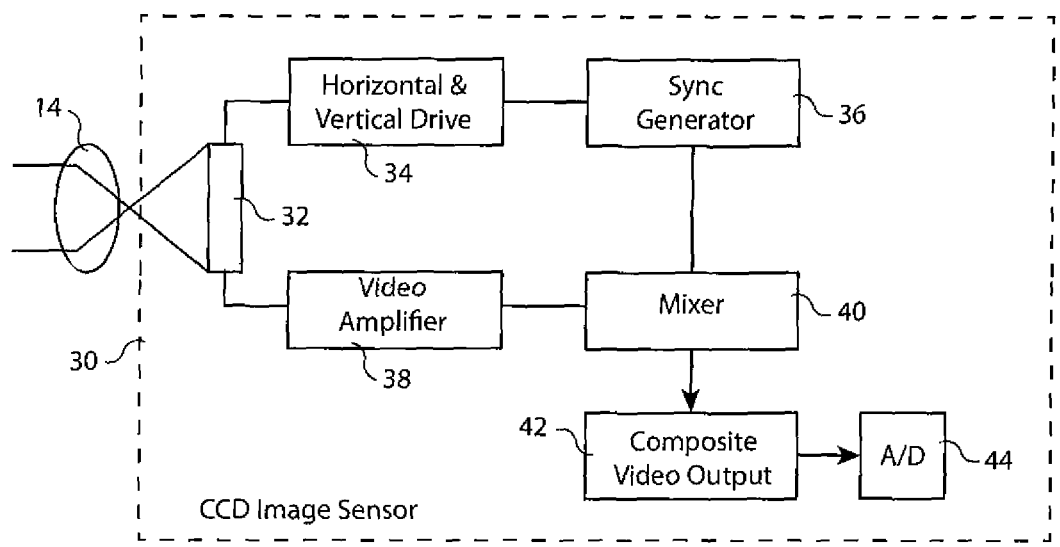
FIG. 2 is a block diagram of an example assembly of a lens and associated analog composite video circuitry for a digital camera.

FIG. 2 is a block diagram of an example assembly of the lens 14 and associated digital light imaging sensor 30 for the digital camera 10 of FIGS. 1A and 1B. The digital light imaging sensor 30, in this non-limiting example, includes a Charge Coupled Device (CCD) image sensor 32, horizontal and vertical drive circuitry 34, sync generator 36, video amplifier 38, mixer 40, composite video output 42, and an analog-to-digital (A/D) converter 44. The horizontal and vertical drive 34 drives the matrix of pixels of the CCD to provide an analog signal to video amplifier 38. The output of the video amplifier 38 is mixed with a sync generator signal from sync generator 36 in mixer 40 to provide an analog composite video output 42, which is digitized by A/D converter 44.

Figure 3:
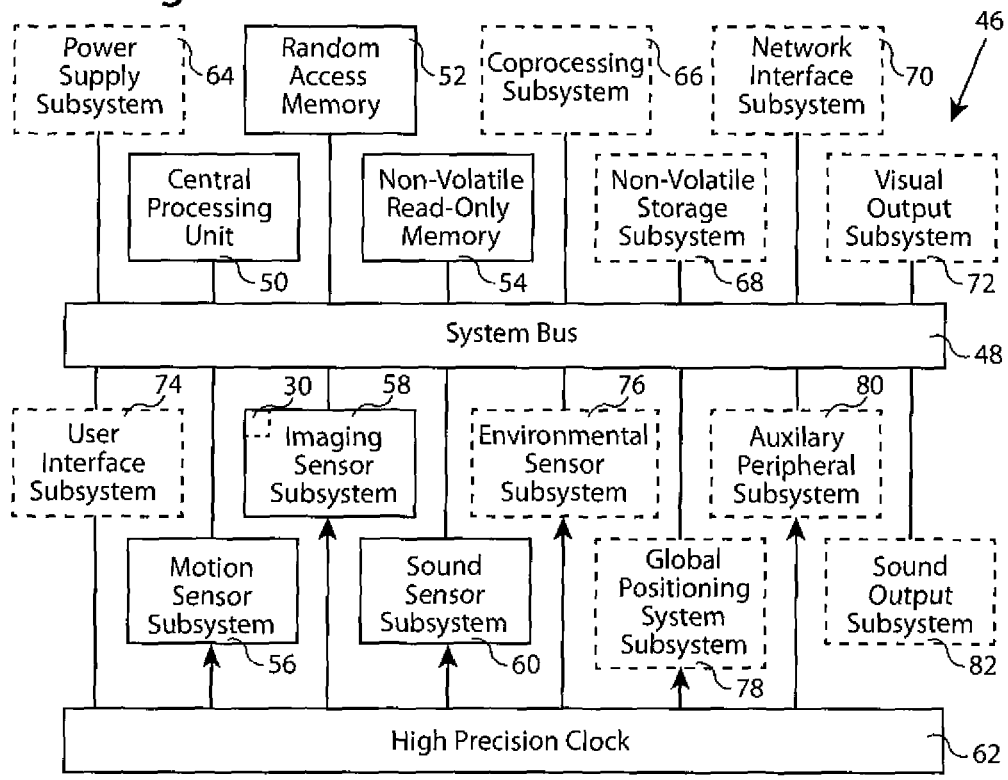
FIG. 3 is a block diagram of an example input processing system for a digital camera.

FIG. 3 is a block diagram of an example input processing system 46 for the digital camera 10 of FIGS. 1A and 1B. The input processing system, in this non-limiting example, is built around a system bus 48, and includes a central processing unit (CPU) 50, random access memory (RAM) 52, non-volatile read-only memory (ROM) 54, a motion sensor subsystem 56, and imaging sensor subsystem 58, and a sound sensor subsystem 60. The motion sensor subsystem 56, the imaging sensor subsystem 58 and the sound sensor subsystem 60, in this example, are each driven by a common, synchronous, high precision clock 62. The high precision clock 62 provides a highly accurate common timing reference for the synchronization of the system components. By "high precision clock" it is meant that the period of the clock is very regular, e.g. does not vary by a small fraction of a percent from cycle to cycle. Such high precision clocks are typically implemented as quartz crystal clocks. ROM 54 can be implemented in a number of technologies including PROM, EEPROM and Flash memory technologies. The CPU 50 can be implemented as a microprocessor, microcontroller, etc., and will generally be referred to herein as a "digital processor," The digital particle velocity sensor 33 can form a part of the sound sensor subsystem 60.

Various alternate embodiments of input processing system 46 include a power supply subsystem 64, a coprocessing subsystem 66, a non-volatile storage subsystem 68, a network interface subsystem 70, a visual output subsystem 72, a user interface subsystem 74, an environmental sensor subsystem 76, a global positioning subsystem 78, an auxiliary peripheral subsystem 80, and a sound output subsystem 82.

As noted previously, the input processing system 46 can be implemented as part of a digital camera 10 or can be instantiated in a smartphone or other mobile device. Advantages of implementing the input processing system 46 in, for example, a smartphone include that much of the electronic and firmware components are already built-in and/or can be added as peripherals via an interface and that the functionality of the system can be implemented using smartphone "apps." Disadvantages of current day smartphones include limited hardware and computational power.

The process of estimating relative motion from frequency shift is known as Doppler imaging. In an embodiment, set forth by way of example and not limitation, Doppler imaging is used for acoustic tracking of position and velocity. Local motion signals derived from Doppler imaging can be used in conjunction with, or in the absence of, a dedicated motion sensor.

The Structure from Motion (SfM) process, is typically a photogrammetric range imaging technique for estimating three-dimensional structures from two-dimensional image sequences that may be coupled with local motion signals. Finding structure from motion presents a similar problem to finding structure from stereo vision. In both cases, the correspondence between images and the reconstruction of 3D objects is derived algorithmically, However, and by way of non-limiting example, in certain embodiments the SfM process can use alternatively and/or additionally the sound sensor data to develop 3D models of the ambient environment under, for example, low light conditions. That is, in certain non-limiting examples, the image sensor data is not required for the SfM process.

In automated mapping, Simultaneous Localization and Mapping (SLAM) is the computational problem of constructing or updating a map or model of an unknown environment while simultaneously keeping track of an agent's location within it. There are a number of SLAM algorithms in use in robotic mapping systems, including the particle filter and extended Kalman filter algorithms. A particle filter method comprises a set of genetic-type particle Monte Carlo methodologies to solve filtering problems arising in signal processing and Bayesian statistical interference. The filtering problem includes estimating the internal states in dynamical systems when only partial observations are made, and when random perturbations are present in the sensor inputs. Due to the complexity of SLAM algorithms, they are generally performed in a computing system separate from the camera itself.

Figure 4:
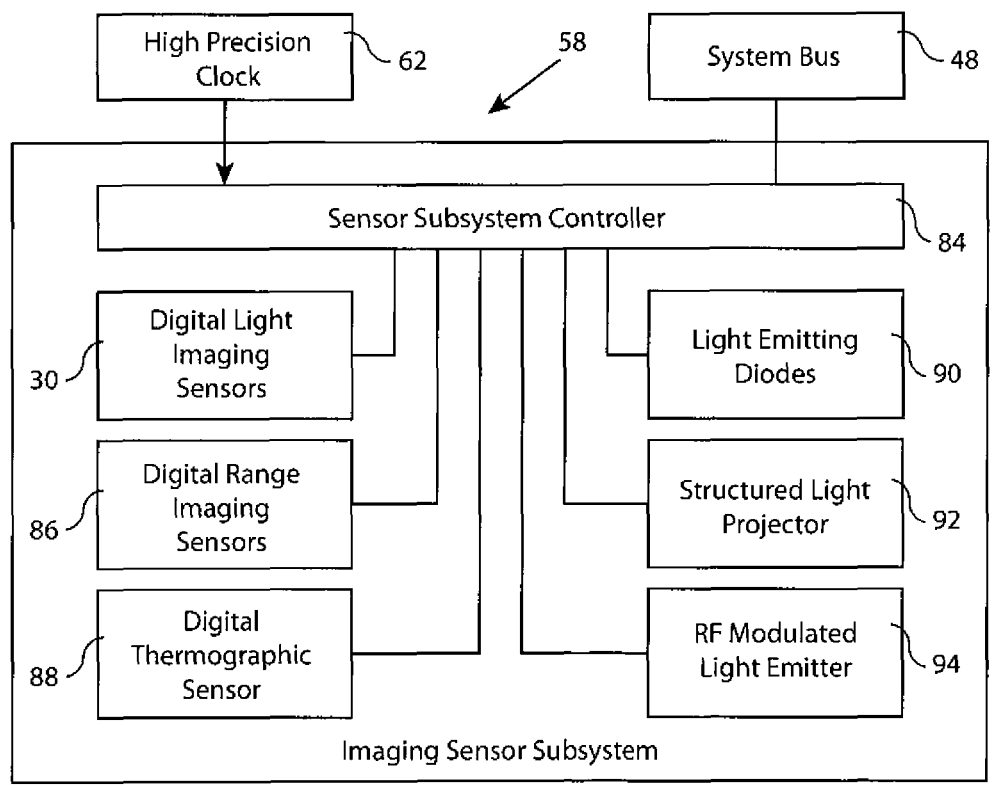
FIG. 4 is a block diagram of an example Imaging Sensor Subsystem of FIG. 3.

FIG. 4 is a block diagram of an example imaging sensor subsystem 58 of FIG. 3 that is coupled to the high precision clock 62 and to the system bus 48. In this non-limiting example, the imaging sensor subsystem 58 includes multiple digital light imaging sensors 30 coupled to a sensor subsystem controller 84 as well as multiple digital range imaging sensors 86, digital thermographic sensor 88, light emitting diodes (LEDs) 90, structured light projector 92 and radio frequency (RF) modulated light emitter 94, each of which is also coupled to the sensor subsystem controller 84. In this non-limiting example, the imaging sensors (30, 86, 88) can be used in conjunction with the light emitting components (90, 92, 94) to support robust operation in a wide range of lighting conditions. The light emitting components can be implemented in a number of configurations including, by way of non-limiting example, as a part of flash assembly 24 of digital camera 10.

Figure 5:
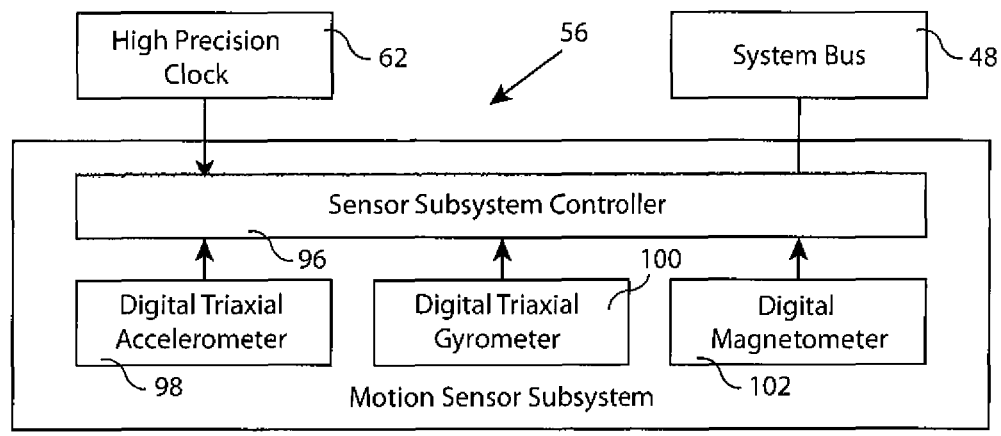
FIG. 5 is a block diagram of an example Motion Sensor Subsystem of FIG. 3.

FIG. 5 is a block diagram of an example motion sensor subsystem 56 of FIG. 3. In this non-limiting example, the motion sensor subsystem 56 includes a sensor subsystem controller 96 coupled to the high precision clock 62 and the system bus 48, as well as a digital triaxial accelerometer 98, digital triaxial gyrometer 100 and a digital magnetometer 102, each of which is coupled to the sensor subsystem controller 96. The motion sensor subsystem data can be used, for example, to measure relative inertial motion and inclinometry.

Figure 6:
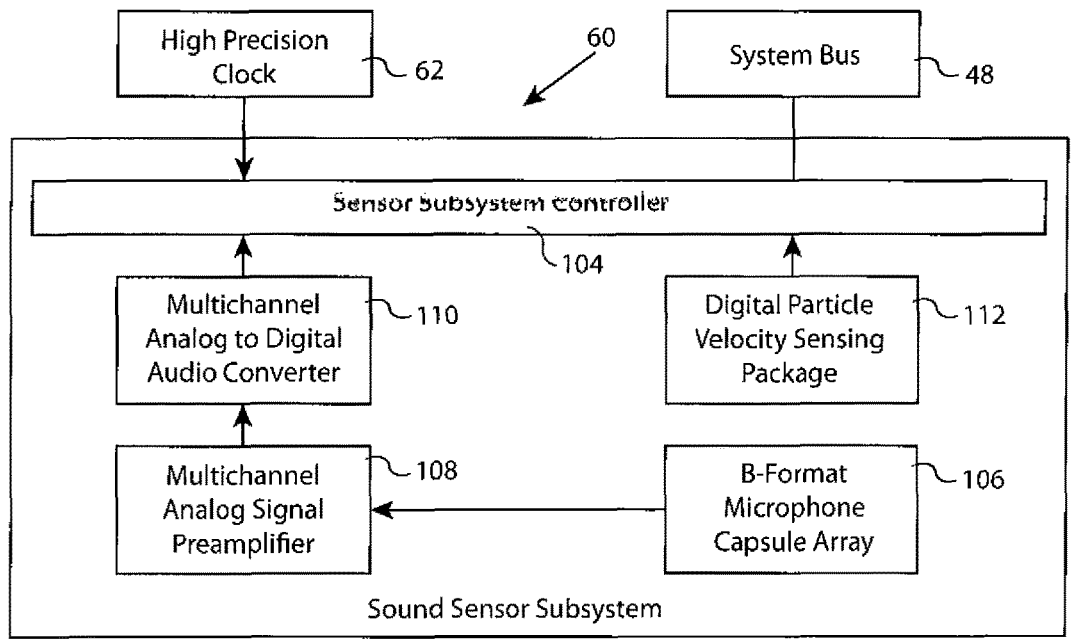
FIG. 6 is a block diagram of an example Sound Sensor Subsystem of FIG. 3.

FIG. 6 is a block diagram of an example sound sensor subsystem 60 of FIG. 3. In this non-limiting example, sound sensor subsystem 60 includes a sensor subsystem controller 104, a B-format microphone capsule array 106, a multichannel analog signal preamplifier 108, a multichannel analog-to-digital (A/D) audio converter 110, and a digital particle velocity sensing package 112. In this non-limiting example, the B-Format microphone capsule array 106 is connected to the multichannel A/D audio converter 110 via the multichannel analog audio signal preamplifier 108. The B-format microphone capsule array 106 can be used, among other purposes, to capture three-dimensional sound fields. The digital particle velocity sensing package 112 can be used, among other purposes, to measure acoustic scattering and absorptive properties of surfaces. The digital particle velocity sensing package 112 can also be used in conjunction with the B-format microphone capsule array 106 to, for example, calculate acoustic source direction vectors. Acoustic responses to the sound impulses produced by the digital particle velocity sensing package 112 can be captured using the B-format microphone capsule array 106 also, for example, to support analysis of environmental reverberation characteristics.

Figure 7:
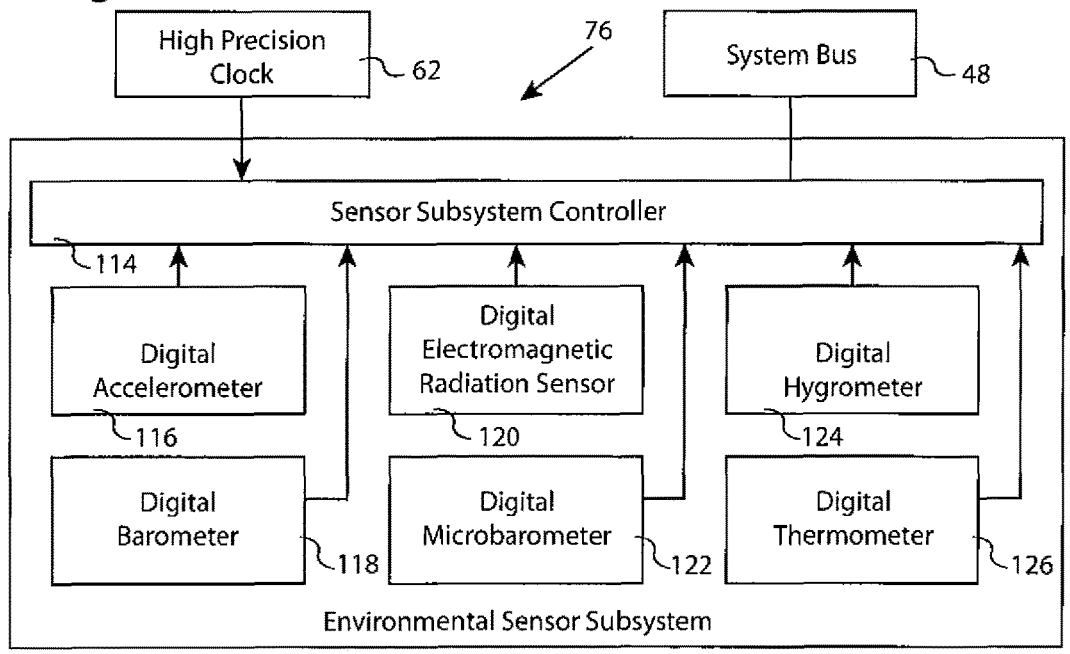
FIG. 7 is a block diagram of an example Environmental Sensor Subsystem of FIG. 3.

FIG. 7 is a block diagram of an example environmental sensor subsystem 76 of FIG. 3. The optional environmental sensor subsystem 76 can be used to capture a multitude of environmental properties. In this non-limiting example, the environmental sensor subsystem 76 includes a sensor subsystem controller 114 coupled to the high precision clock 62 and system bus 48, as well as a digital accelerometer 116, a digital barometer 118, a digital electromagnetic radiation sensor 120, a digital microbarometer 122, a digital hygrometer 124 and a digital thermometer 126.

FIG. 8 is a block diagram of an example Global Positioning System (GPS) subsystem 78 of FIG. 3. In this non-limiting example, the GPS subsystem 78 includes a sensor subsystem controller 128 coupled to the high precision clock 62 and the system bus 48, as well as a GPS antenna 130 and a GPS satellite receiver 132.

FIG. 9 is a block diagram of an example auxiliary peripheral subsystem 80 of FIG. 3. In this non-limiting example, peripheral interface controllers 134 are coupled to the system bus 48, and I/O ports, such as USB connectors 136 and GPIO connectors 138 are coupled to the peripheral interface controllers 134. Optionally, the auxiliary peripheral subsystem 80 is coupled to the high precision clock 62, as seen in FIG. 3.

Figure 10:
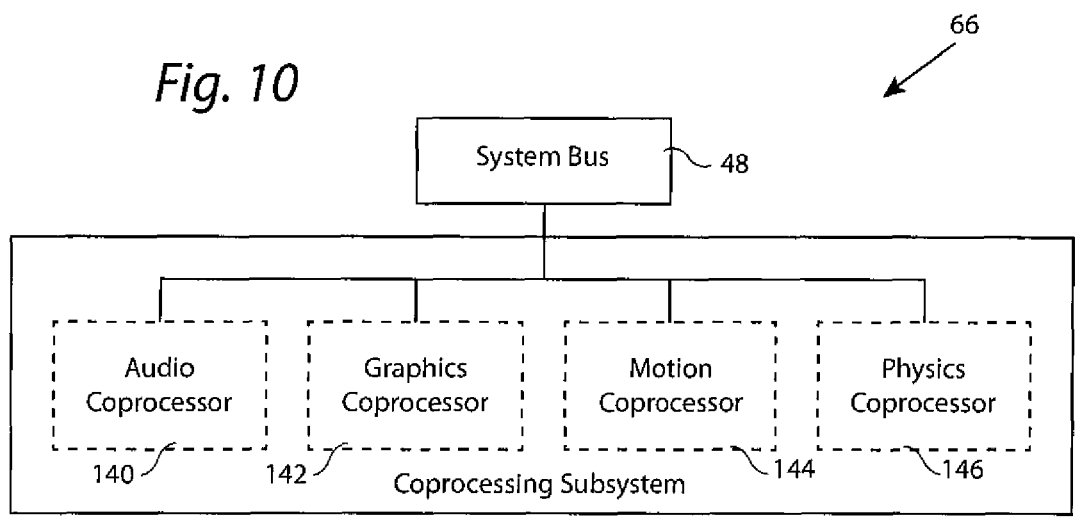
FIG. 10 is a block diagram of an example Coprocessing Subsystem of FIG. 3.

FIG. 10 is a block diagram of an example coprocessing subsystem 66 of FIG. 3. In this non-limiting example, optional audio coprocessor 140, graphics coprocessor 142, motion coprocessor 144 and physics coprocessor 146 are coupled to the system bus 48.

Figure 11:
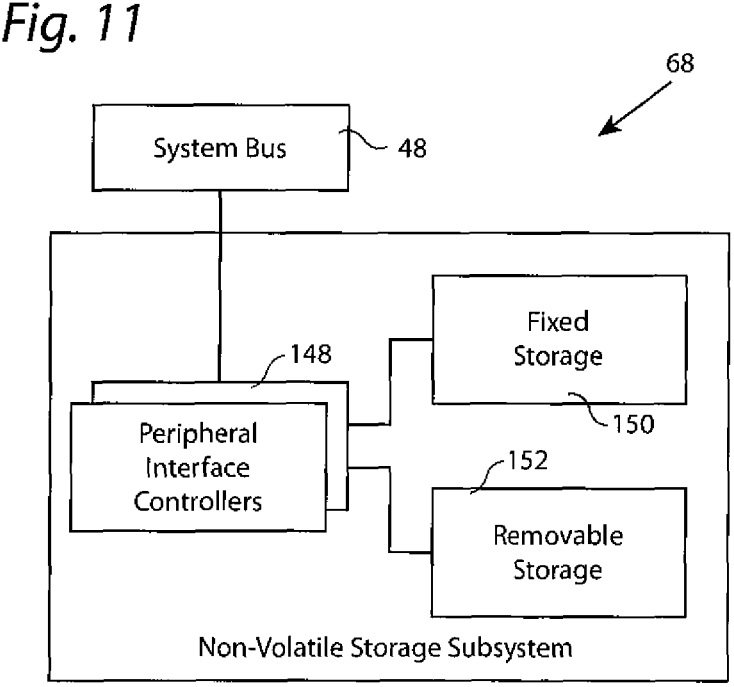
FIG. 11 is a block diagram of an example Non-Volatile Storage Subsystem of FIG. 3.

FIG. 11 is a block diagram of an example non-volatile storage subsystem 68 of FIG. 3. In this non-limiting example, the non-volatile storage subsystem 68 includes peripheral interface controllers 148 coupling fixed storage 150 and removable storage 152 to the system bus 48.

FIG. 12 is a block diagram of an example network interface subsystem 70 of FIG. 3 In this non-limiting example, network interface controller(s) (NICs) 154 are coupled to the system bus 48, an Ethernet transceiver 156 couples an Ethernet connector 158 to the network interface controllers 154, a Wi-Fi transceiver 160 couples a Wi-Fi antenna 162 to the network interface controllers 154, a cell network transceiver 164 couples a cell network antenna 166 to the network interface controllers 154, and a Bluetooth transceiver 168 couples a Bluetooth antenna 170 to the network interface controllers 154. Data from the network interface subsystem 70 such as, but not limited to, received signal strength can also be used by a SLAM module (to be discussed subsequently) for enhanced localization and mapping, and also be used by a physical properties module (also to be discussed subsequently) for example to estimate mass attenuation coefficients.

FIG. 13 is a block diagram of an example user interface subsystem 74 of FIG. 3. In this non-limiting example, a sensor subsystem controller 172 is coupled to the system bus 48. Optional user interfaces are coupled to the sensor subsystem controller 172, including a keyboard 174, an XY touchpad 176, a touch digitizer 178, physical switches 180, linear encoders 182 and rotary encoders 184.

Figure 14:
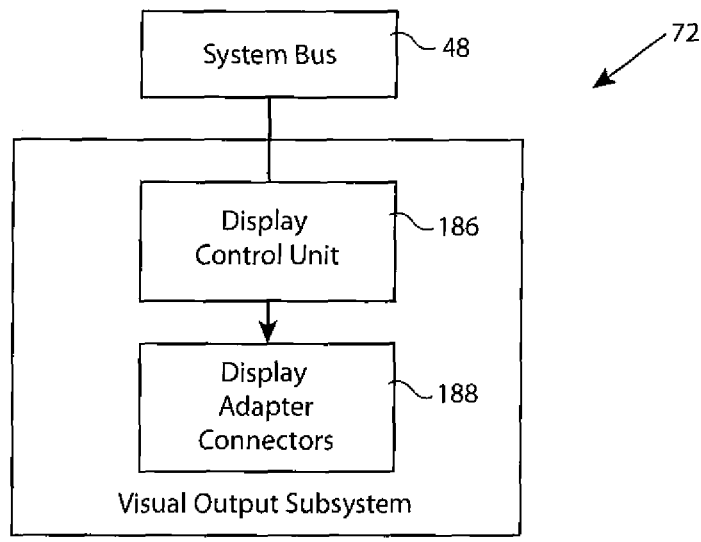
FIG. 14 is a block diagram of an example Visual Output Subsystem of FIG. 3.

FIG. 14 is a block diagram of an example visual output subsystem 72 of FIG. 3. In this non-limiting example, the visual output subsystem 72 includes a display control unit 186 coupling the system bus 48 to display adapter connectors 188.

Figure 15:
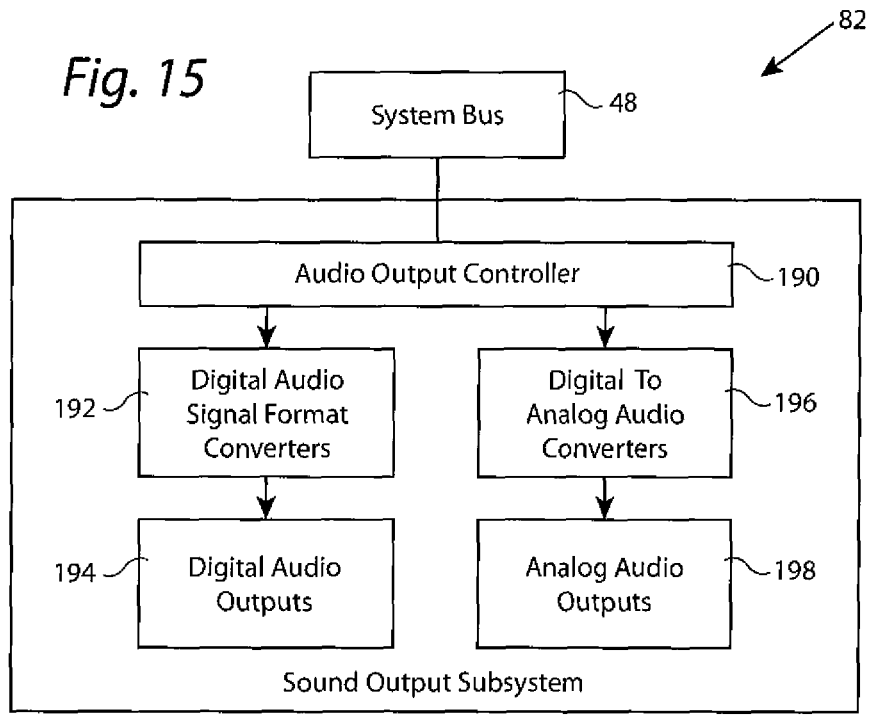
FIG. 15 is a block diagram of an example Sound Output Subsystem of FIG. 3.

FIG. 15 is a block diagram of an example sound output subsystem 82 of FIG. 3. In this non-limiting example, the sound output subsystem 82 includes an audio output controller 190 coupled to the system bus 48, digital audio signal format converters 192 coupling digital audio outputs 194 to the audio output controller 190, and digital to analog audio converters 196 coupling analog audio outputs 198 to the audio output controller 190.

Figure 16:
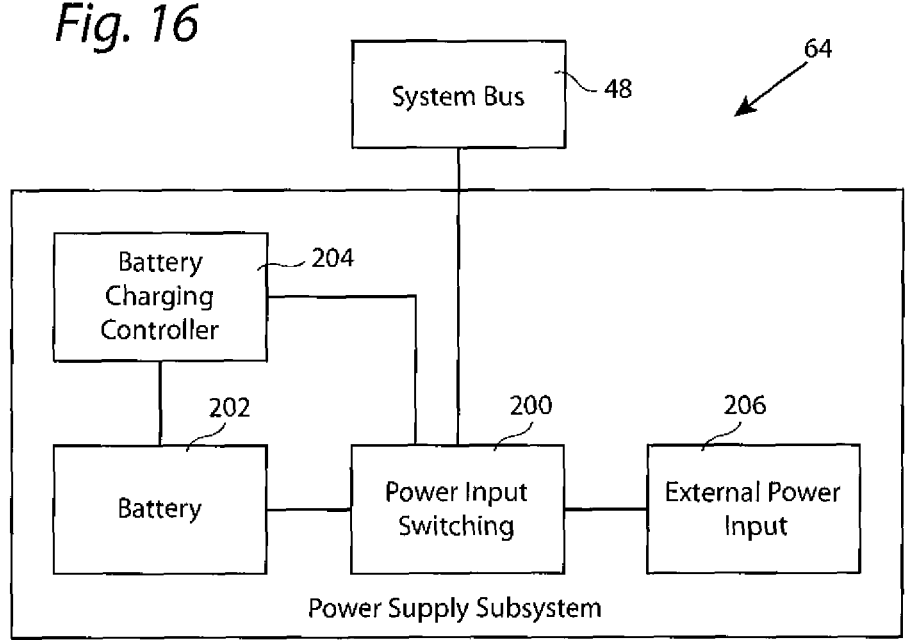
FIG. 16 is a block diagram of an example Power Supply Subsystem of FIG. 3.

FIG. 16 is a block diagram of an example power supply subsystem 64 of FIG. 3. In this non-limiting example, power supply subsystem 64 includes power input switching 200 coupled to the system bus 48, a battery 202 coupled to the power input switching 200, a battery charging controller 204 coupled to the power input switching 200 and to the battery 202, and external power input 206 coupled to power input switching 200.

Figure 17:
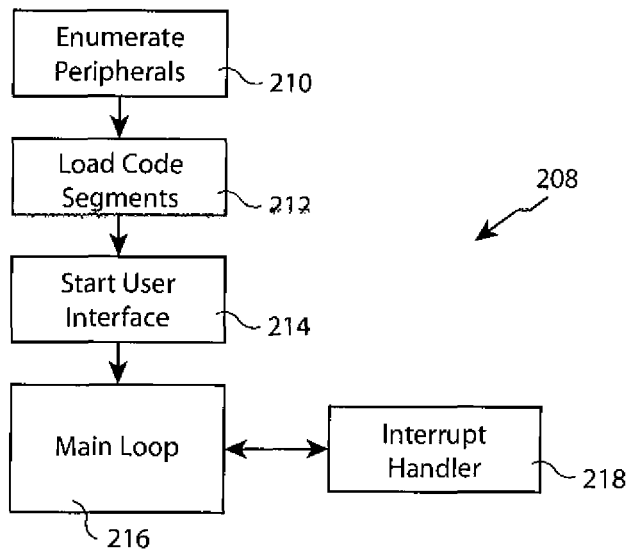
FIG. 17 is a flow diagram of an example root operating process for a digital camera.

FIG. 17 is a flow diagram of an example root operating process 208 for digital camera 10. This root operating process 208 can be run on, for example, CPU 50 of FIG. 3. Upon initial camera power-up, a operation 210 enumerates the peripherals, an operation 212 loads code segments and an operation 214 starts user interface. The code segments are preferably stored in non-volatile, read-only memory such as memory 54 of FIG. 3, although other forms of non-volatile memory may be used, including EEPROMS, Flash memory, etc. After these initialization steps, root operating process 208 enters the main loop 216. An interrupt handler 218 can interrupt the main loop 216 for event-driven processing. As timestamped frames of data become available from the sensor subsystems, the frames are passed to code segment modules for processing.

Figure 18:
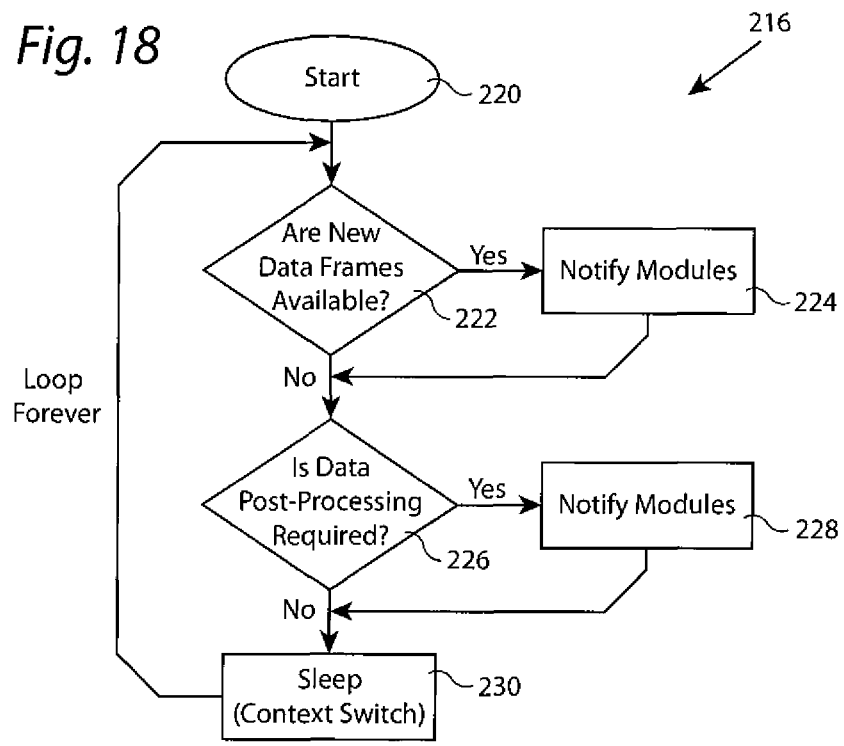
FIG. 18 is a flow diagram of an example Main Loop of FIG. 17.

FIG. 18 is a flow diagram of an example main loop process 216 of FIG. 17 which begins at 220 and then determines if there are any new data frames available in an operation 222. If yes, an operation 224 notifies modules. If there are not new data frames available, or after operation 224, an operation 226 determines if data post-processing is required. If yes, an operation 228 notifies modules. If data post processing is not required, or after operation 228, an operation 230 causes the digital camera 10 to enter a low-power "sleep" mode, and process control is returned to operation 222.

Figure 19:
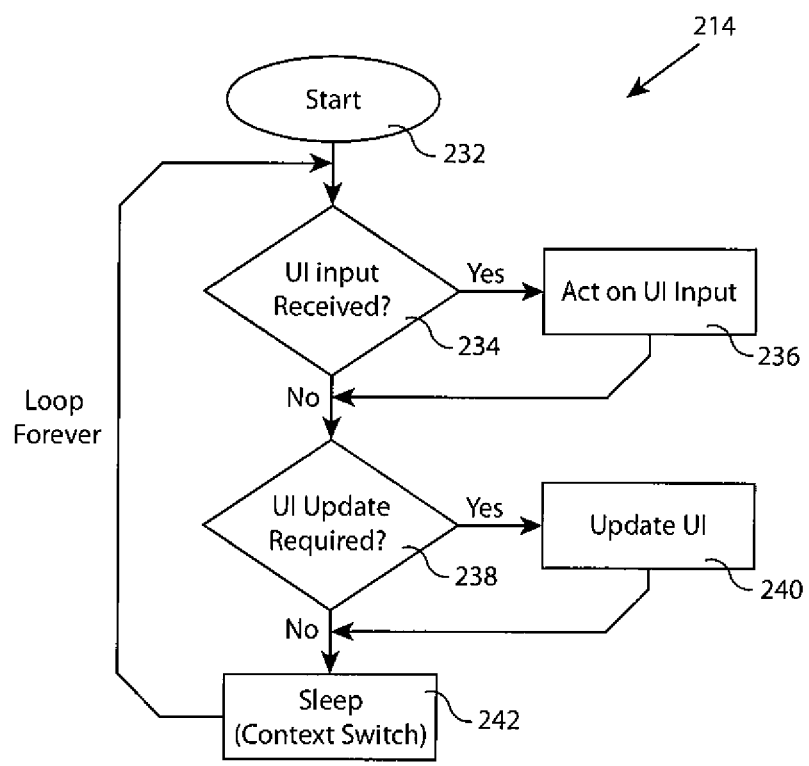
FIG. 19 is a flow diagram of an example User Interface Management process.

FIG. 19 is a flow diagram of an example start user interface process 214 of FIG. 17 which begins at 232 with an operation 234 determining if a user input (UI) has been received. If so, an operation 236 acts upon the UI input. If not, or after operation 236, an operation 238 determines if a UI update is required. If so, an operation 240 updates the UI and, if not, or after operation 240, a sleep operation 242 is performed. Process control is then returned to operation 234 in a continuous loop.

It will be appreciated that the hardware and the code segments (typically firmware) which controls the operation of digital camera 10 allows it to be operated in a number of modes, ranging from a still camera, to a video camera, to an advanced "smart" camera capable of modeling the environment and creating real-time mixed reality sounds and images. The latter is accomplished by virtualizing the physics of the environment in real-time or near real-time by entering a virtualization mode and "scanning" the environment with the multiple sensors of the environment. For example, the environment can be scanned by panning the digital camera 10 in a circular pattern from the center of a room. In this example, the digital camera 10 can capture measurements of physical properties of an environment in order to apply synthesized properties, components and materials to the environment, producing simulations that match up with expected real world results.

By way of non-limiting example, the digital camera 10 can be used to provide real-time audio enhancements for augmented/mixed reality applications. In this example, the digital camera 10 actively monitors the environment (e.g. by scanning a room) and continuously adjusts simulation settings for optimal quality of immersion. Correlation between multiple sensors can conform environmental measurements, providing the system with a confidence level for the simulation result.

Sound is time-dependent and so, for acoustic modeling, predictable variable and cyclical properties can be identified, analyzed, and accounted for. In this non-limiting example, digital camera 10 uses the current state of the environment (in addition to data previously collected) to precondition the computational solver module 280, leading to faster convergence and allowing for real-time or near real-time accurate simulation of the results. The preconditioning of the computational solver module 280 with data from at least one of the sensor subsystems accelerates the computational process for developing AR images and/or AR sound to overlay the ambient environment.

By way of non-limiting example, digital camera 10 can provide the basis for predictive modeling for the blind. A configuration of this device can be used to construct a predictive model that can be used to provide feedback to a visually impaired individual. By capturing the physical geometry of the environment along with its properties in real-time and through the use of the devices' various sensors, the device can construct a model representing an understanding of the components of such an environment. This can be processed into a contextual awareness which can then be used to provide a predictive response to a blind individual.

By way of non-limiting example, the digital camera 10 may scan the environment and identify that the person holding the camera is standing at a street corner and, via the sound sensors, identify the sounds of cars in the distance. Through information such as the direction the person is facing, and the sound of oncoming cars, it can inform the person when the optimal time to cross this road may be, or when the person should avoid crossing the road.

The advanced modeling and predictive modeling of digital camera 10 can be accomplished in three basic steps or stages. In this example, stage one is the collection of raw input data, which will be discussed in greater detail with respect to FIG. 20. Stage two derives metadata from the raw input collected by stage one, and will be discussed in greater detail with respect to FIG. 21. Stage three aggregates the metadata and the raw input data to develop a model of the environment, and will be discussed in greater detail with respect to FIG. 22. For example, with acoustic modeling, it can be predicted how a new sound would be heard in a modelled environment by a user.

Figure 20:
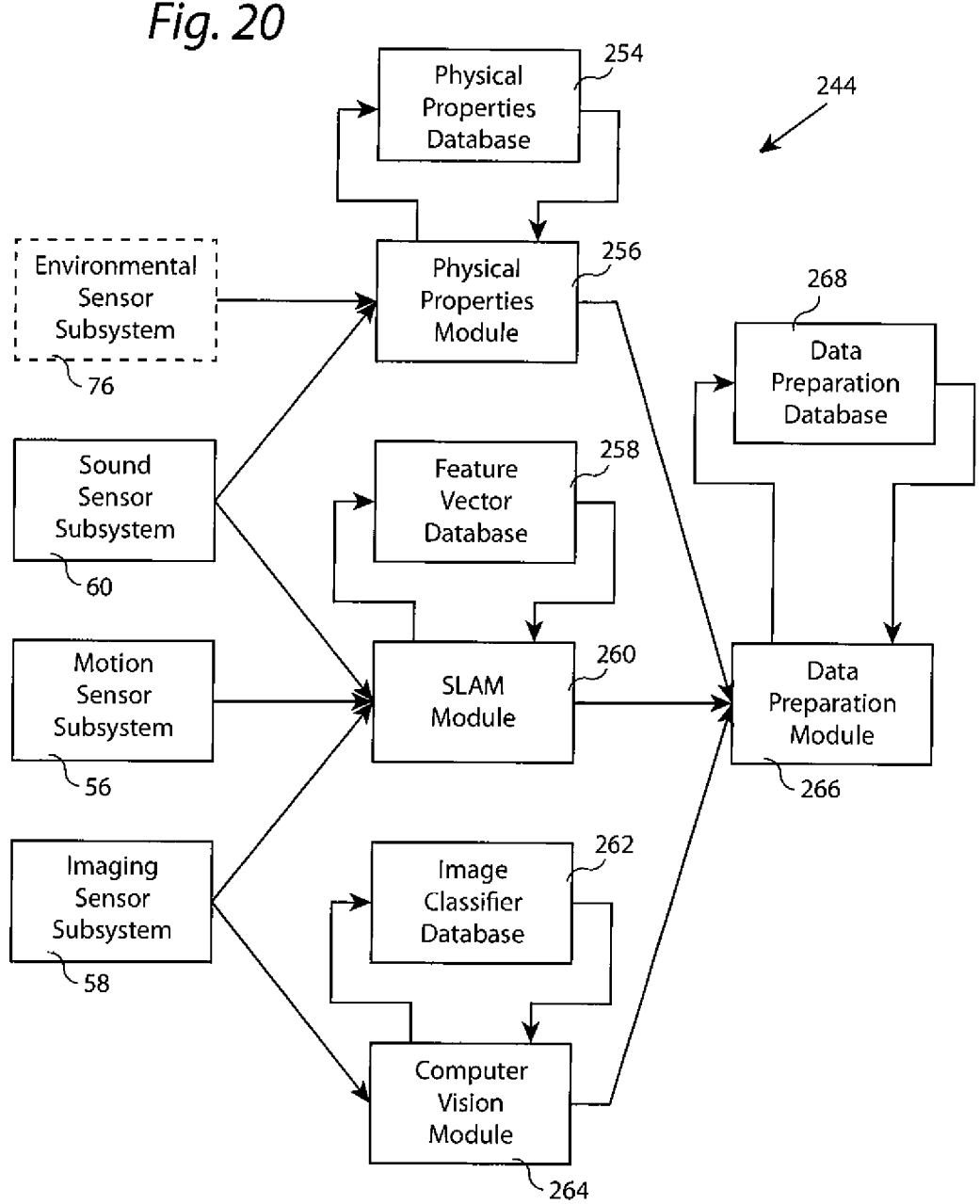
FIG. 20 is an illustration of an example Data Acquisition process.

FIG. 20 is an illustration of an example data acquisition process 244, which starts with inputs from optional environmental sensor subsystem 76, sound sensor subsystem 60, motion sensor subsystem 56, and imaging sensor subsystem 58. The output of the sensor subsystems are processed using a physical properties database 254, a physical properties module 256, a feature vector database 258, a SLAM module 260, an image classifier database 262 and a computer vision module 264. The outputs of the physical properties module 256, the SLAM module 260 and the computer vision module 264 is input to a data preparation module 266, which is coupled to a data preparation database 268.

The Simultaneous Localization and Mapping (SLAM) module 260 can process data from the motion sensor subsystem 56 in conjunction with data from other sensor subsystems such as but not limited to the imaging sensor subsystem 58 and sound sensor subsystem 60 to construct a three-dimensional geometric model of the environment. Frames of data can be transformed using feature extraction techniques, and the resulting localized feature vectors can be stored in a database 258 to support correction of tracked position and orientation of an apparatus in motion.

The physical properties module 256 can process data from the sound sensor subsystem 60 to evaluate physical properties in the environment, such as but not limited to material absorption and scattering coefficients, and reverberation characteristics. It will be appreciated that physical properties module 256 can process data from the environmental sensor subsystem 76 such as but not limited to wind speed, air pressure, humidity, and temperature to improve the simulation model, for example when calculating attenuation and the speed of sound.

The physical properties module 256 can work in conjunction with a physical properties database 254 including but not limited to predefined mass attenuation coefficients and localized acoustic impulse responses. The computer vision module 264 can process data from the imaging sensor subsystem 58 using techniques such as, but not limited to, edge detection. The computer vision module 264 can also process data from the imaging sensor subsystem 58 in conjunction with an image classifier database 262 of object images to classify visually recognizable objects in the image frame, such as but not limited to loudspeakers and microphones, and estimate their pose in the environment. The computer vision module 264 can also process data from the imaging sensor subsystem 58 in conjunction with an image classifier database 262 of material images to classify visually recognizable materials in the image frame, such as but not limited to brick and wood. The data preparation module 266 combines timestamped frames of data output from the sensor subsystems to prepare a simulation model for the computational solver module 280, to be discussed subsequently.

The simulation model can include data such as but not limited to geometry, material properties, boundary conditions, and position and orientation of sound emitters and receivers such as loudspeakers, transducers, and microphones. The simulation model can be augmented with virtual content such as but not limited to loudspeakers, acoustic treatments, and furnishings. The data preparation module 266 can perform sensor and data fusion using actual sensor data frames, and also synthesized data produced by neural networks trained with data sets such as but not limited to historical solution results. The data preparation module 266 can process data from the environmental sensor subsystem 76 such as, but not limited to, electromagnetic field strength and infrasonic noise to improve the simulation model by, for example, compensating for biases in the sensor subsystems.

The data acquisition process 244 of FIG. 20 collects information about the world through each of the sensors in their capabilities. By way of non-limiting examples, imaging sensors can capture RGB-D data, sound sensors can capture auditory data, and so on. The sensor inputs are sent to various modules which will infer additional metadata about the captured information. For example, a wall can be identified as being made from brick after being observed by the sound sensors and compared to previous readings from the material database. Additionally, visual features such as "texture" can be processed against the computer vision database to derive additional metadata from the surface such as surface uniformity (e.g. for brick pattern). The metadata generated from the database processing modules can then be aggregated to construct a model of the scanned environment.

Figure 21:
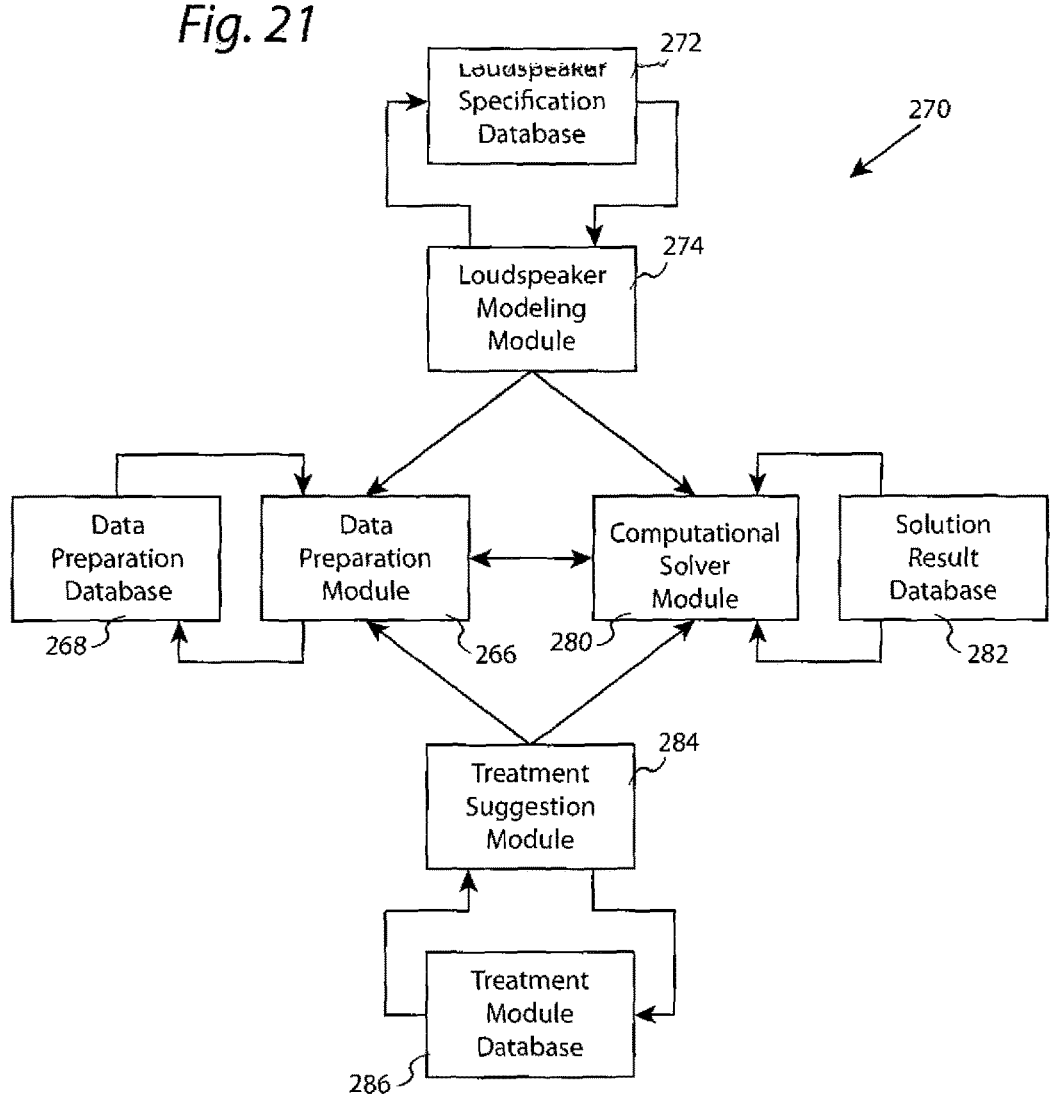
FIG. 21 is an illustration of an example Data Processing process.

FIG. 21 is an illustration of an example data processing process 270 including a loudspeaker specification database 272, a loudspeaker modelling module 274, the data preparation database 268, the data preparation module 266, a computational solver module 280, a solution result database 282, a treatment suggestion module 284, and a treatment module database 286.

The computational solver module 280 can compute numerical solutions using the simulation model prepared by the data preparation module 266 in conjunction with a multitude of numerical solution methods such as but not limited to Ray Tracing, Boundary Element Method, and Finite Element Method solvers. The computational solver module 280 can be preconditioned with fused data from the sensor subsystems and digital neural networks to accelerate convergence of the numerical solution.

The treatment suggestion module 284 can be used in conjunction with the data preparation module 266 and the computational solver module 280 to calculate geometric and material properties of acoustic treatment apparatuses. The treatment suggestion module 284 can use a database of acoustic treatment apparatus models 286 to support simulation and analyses of said apparatuses in situ.

The loudspeaker modeling module 274 can use the output from the data preparation module 266 in conjunction with the output from the computational solver module 280 to simulate a multitude of loudspeakers in arbitrary positions. The loudspeaker modeling module 274 can use a database of loudspeaker specifications 272 to support simulation and analyses of loudspeakers.

Data preparation module 266 aggregates data collected from the environment along with data about suggested acoustic modifications, e.g. existing or potential speakers and any acoustic treatment that may exist or be suggested for the room. This information can be fed into the computational solver module 280 which can provide a 3D representation of an acoustic field that would result from that configuration. This information is useful to identify problematic areas in the room setup, before investment of time, effort, or money into actual modifications. The process can therefore predict what a room will sound like, given virtual speaker and acoustic treatment configurations (e.g. padding on the wall to absorb low frequencies).

Figure 22:
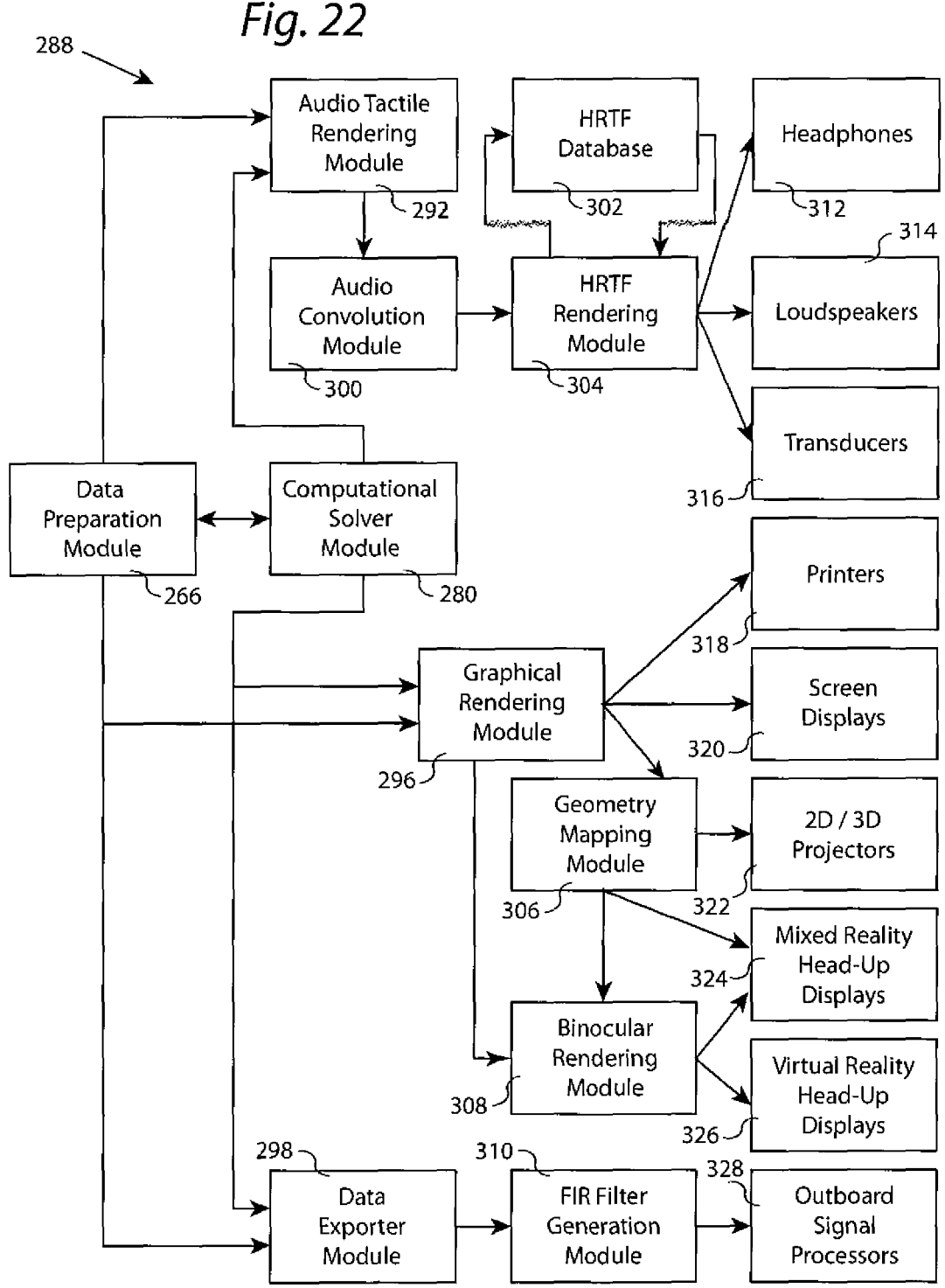
FIG. 22 is an illustration of an example Data Rendering process.

FIG. 22 is an illustration of an example data rendering process 288. The data preparation module 266 is coupled to an audio tactile rendering module 292, the computational solver module 280, a graphical rendering module 296, and a data exporter module 298. The audio tactile rendering module 292 feeds into an audio convolution module 300. A Head-Related Transfer Function (HRTF) database 302 and HRTF rendering module 304 are coupled to an output of the audio convolution module 300. Geometry mapping module 306 and binocular rendering module 308 are coupled to an output of the graphical rendering module 296, and a Finite Impulse Response (FIR) filter generation module 310 is coupled to an output of the data exporter module 298. Outputs include headphones 312, loudspeakers 314, transducers 316, printers 318, screen displays 320, 2D/3D projectors 322, mixed reality head-up displays 324, virtual reality head-up displays 326 and outboard signal processors 328.

The data exporter module 298 can provide data export capability in a multitude of formats such as but not limited to FIR filter coefficients. In this non-limiting example, the FIR filter generation module 310 can generate FIR filter coefficients for use with outboard signal processors 328.

The audio tactile rendering module 292 can use the output from the data preparation module 266 in conjunction with the output from the computational solver module 280 to render spatial and tactile audio for delivery via sound reproduction devices such as but not limited to headphones 312, loudspeakers 314, and transducers 316.

The audio convolution module 300, in this non-limiting example, can work in conjunction with the audio tactile rendering module 292 to convolve simulated acoustic environmental characteristics with real acoustic environmental characteristics.

In this non-limiting example, the Head-Related Transfer Function is used for spatial domain convolution of synthesized sound for binaural delivery. The HRTF rendering module 304, in this non-limiting example, can work in conjunction with the audio tactile rendering module 292 and audio convolution module 300 to convolve localized audio signals for binaural delivery. The HRTF rendering module 304, in this non-limiting example, can make use of a HRTF database 302 for individualized binaural convolution.

The graphical rendering module 296, in this non-limiting example, can use the output from the data preparation module 266 in conjunction with the output from the computational solver module 280 to render graphical displays for output to printers 318 or screen displays 320. The graphical rendering module 296, in this non-limiting example, can also work in conjunction with the geometry mapping module 306 to convolve the graphical output with the geometry of the environment for output via 2-D or 3-D projectors 322, The graphical rendering module 296, in this non-limiting example, can also work in conjunction with the binocular rendering module 308 to render the graphical output for binocular displays such as, but not limited to, head-up displays 324 and 326.

In an alternative non-limiting example, the simulation model can be constructed using existing data such as but not limited to Computer Aided Design or Building Information Model data. In an alternative non-limiting example, statically positioned range imaging sensors such as but not limited to Light Detecting and Ranging (LIDAR) can be used for three-dimensional geometry reconstruction. In an alternative non-limiting example, material properties can be assigned from predefined mass attenuation, absorption, and scattering coefficient data sets. In an alternative non-limiting example, the sound sensor subsystem 60 can use an A-format microphone capsule array instead of the B-Format array. In an alternative non-limiting example, the sound sensor subsystem 60 can use a single microphone capsule instead of the B-Format array.

Continuing with the previous acoustic modeling example, it will be appreciated that camera 10 has the ability to leverage the aggregate environmental properties, existing and virtual speaker properties, room treatment, and computational results for various purposes. One example purpose is to simulate virtual environments with high accuracy in the current available configuration of the environment (e.g., using speaker locations to simulate natural sounds with positionally correct spatial imaging), In another example, a user can enter augmented reality to experience the effects of any potential changes to the room before those changes have been applied via headphones. In yet another use case, Finite Impulse Response audio filter coefficients can be derived from the computational solver and applied to an existing signal processor configuration to enhance a listening experience using existing equipment configurations.

In summary, the digital camera 10 knows a great deal of information about the environment, e.g. where the physical speakers are within the room to provide a number of useful services including:

Simulating a new 3D positional environment using existing physical speakers. (e.g. to make a home theater sound like it is a music hall)

Simulating what any changes to the room might do to the resulting audio by giving a user an AR preview as they walk around the room. (e.g. simulating the effect of a new couch on the acoustics of a room)

Determining what's wrong with an existing system (e.g. a surround-sound system) and providing corrective audio curves (settings) to apply to the existing system.

Example—Acoustic Modeling of a Room

Figure 23:
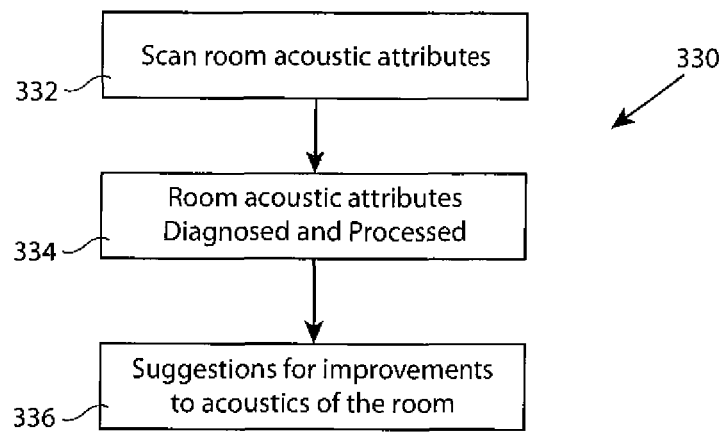
FIG. 23 is a flow diagram of an example use of a digital camera to develop an acoustic model of a room.

With reference to FIG. 23, a process 330 for acoustically modelling a room begins with an operation 332 of scanning the room for acoustic attributes. By way of non-limiting example, a user holding the digital camera 10 can pan the camera around the room to scan the walls, floor, ceiling and objects of interest. Next, in an operation 334, the room acoustic attributes are diagnosed and processed. Finally, in an operation 336, suggestions are made to improve the acoustics of the room.

By way of a further non-limiting example, a user walks into a room and begins scanning the room. Sensors, e.g. one or more of structured light projector, digital range imaging sensors, digital light imaging sensors, digital accelerometer, digital barometer, digital electromagnetic radiation sensor, digital microbarometer, digital hygrometer, digital thermometer, B-format microphone capsule array, multichannel analog signal preamplifier, multichannel analog to digital audio converter, and a digital particle velocity sensing package, along with the SLAM module, provide the user with information about the acoustic properties of the three dimensional model being constructed such as the absorption properties of materials, the reflection properties of materials, the speed of sound, etc. With this information, the user can be provided with an AR visualization overlaid on the physical features of the room after the information has been processed and diagnosed. Additionally, suggestions can be made based on the processed diagnosis about what modifications can be made to improve the acoustics for the space including, but not limited to, acoustic treatments that can be added to the space.

Figure 24:
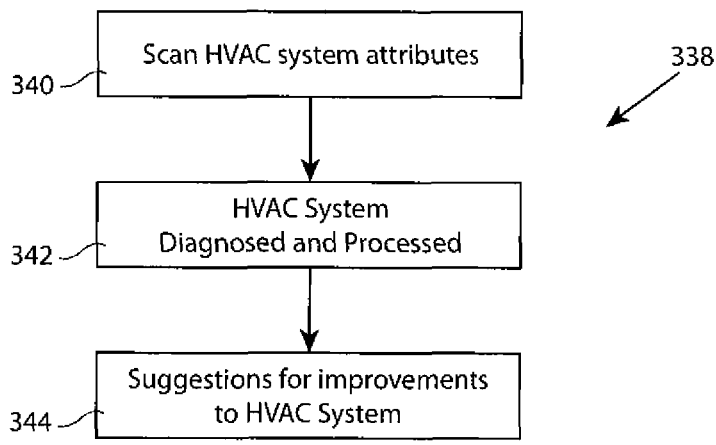
FIG. 24 is a flow diagram of an example use of a digital camera to develop an acoustic model of an HVAC system.

In FIG. 24, a process 338 develops an acoustic model of an HVAC system by first scanning HVAC system attributes in an operation 340. Next, in an operation 342, the HVAC system is diagnosed and processed. Then, in an operation 344, suggestions for improvements to the HVAC system can be made.

By way of non-limiting example, with the process 338, a user can walk into a room and begin to scan the room with the digital camera 10. Sensors, including one or more of a digital barometer, digital electromagnetic radiation sensor, digital microbarometer, digital hygrometer, digital thermometer, and the digital thermographic sensor, along with the SLAM module, provide the user with information about the HVAC system including, for example, the air flow and hot vs. cold air flow streams. With this information, the user can be provided with an AR visualization overlaid on the space after the information has been processed and diagnosed on the screen of the camera. Additionally, suggestions can be made based on the processed diagnosis about what modifications can be made to improve the HVAC system for including, for example, both airflow optimization and acoustic optimization (e.g. the noise level created by the HVAC system in the room).

From the foregoing, it will be appreciated that a method, set forth by way of example and not limitation, for modeling an ambient environment with a digital camera includes:
 collecting raw input data from a plurality of sensors including, at least, an imaging sensor, a sound sensor and a motion sensor;
 deriving metadata from the raw input data; and
 processing the metadata and the raw input data to develop a model of the ambient environment of the digital camera.

For example, the metadata can be derived using the aforementioned Simultaneous Localization And Mapping (SLAM) process and/or the Structure from Motion (SfM) process. The code segments for the SLAM process and/or SIM process can be stored, by non-limiting example, in the non-transitory computer readable media such as non-volatile read-only memory 54. In certain embodiments, the raw input data includes only one of the imaging sensor data and the sound sensor data.

From the foregoing, it will also be appreciated that a method, set forth by way of example and not limitation, for providing an augmented reality (AR) display on a digital camera includes:
 scanning an ambient environment with a digital camera including at least an imaging sensor, a sound sensor and a motion sensor;
 developing a model of the ambient environment with a digital processor of the digital camera that includes physical objects and their properties from data derived from the imaging sensor, the sound sensor and the motion sensor; and
 developing augmented reality (AR) to overlay the ambient environment.

The scanning of the ambient environment may be accomplished by panning the digital camera. The model can be developed using the aforementioned Simultaneous Localization And Mapping (SLAM) process and/or the Structure from Motion (SIM) process. Virtual objects and virtual properties can be stored in one or more databases. The code segments for the SLAM process and/or SIM process can be stored, by non-limiting example, in a non-transitory computer readable media such as non-volatile read-only memory 54, as can be the virtual objects and virtual properties of the one or more databases. In one embodiment, developing AR comprises overlaying an AR image over an image of the ambient environment, wherein the AR image includes virtual objects with virtual properties that are related to physical properties of the ambient environment. In another embodiment, developing AR comprises overlaying AR sound over sound of the ambient environment, wherein the AR sound includes virtual objects with virtual properties that are related to physical properties of the ambient environment. The latter embodiment is particularly useful for the visually impaired, and can also be used to enhance the realism of entertainment experiences.

Although various examples have been described using specific terms and devices, such description is for illustrative purposes only. The words used are words of description rather than of limitation. It is to be understood that changes and variations may be made by those of ordinary skill in the art without departing from the spirit or the scope of any examples described herein. In addition, it should be understood that aspects of various other examples may be interchanged either in whole or in part. It is therefore intended that the claims herein and hereafter presented be interpreted in accordance with their true spirit and scope and without limitation or estoppel.

What is claimed is:

1. A digital camera with audio, visual and motion analysis comprising:
 a camera body;
 a lens supported by the camera body;
 an imaging sensor supported by the camera body in alignment with the lens;
 a sound sensor supported by the camera body;
 an input processing system supported by the camera body including
 (a) a system bus;
 (b) a digital processor coupled to the bus;
 (c) a sound sensor subsystem coupling an output of the sound sensor to the bus;

(d) a high precision clock, separate from a system clock, to provide synchronous clock signals to the sound sensor subsystem; and (e) non-transitory digital memory coupled to the bus including code segments, executable by the digital processor, for real-time audio, visual and motion analysis to develop a digital model of an ambient environment of the digital camera from data derived from the sound sensor subsystem.

2. A digital camera with audio, visual and motion analysis as recited in claim 1 further comprising an imaging sensor subsystem coupling an output of the imaging sensor to the bus, a motion sensor supported by the camera body, and a motion sensor subsystem coupling an output of the motion sensor to the bus, wherein the digital model of the ambient environment is also derived from data from at least one of the imaging sensor subsystem and the motion sensor subsystem.

3. A digital camera with audio, visual and motion analysis as recited in claim 1 further comprising a global positioning sensor and a global positioning sensor subsystem coupling the global positioning sensor to the system bus, and an environmental sensor and a environmental sensor subsystem coupling the environmental sensor to the bus, wherein the digital model of the ambient environment is also derived from data from at least one of the global positioning subsystem and the environmental sensor subsystem.

4. A digital camera with audio, visual and motion analysis as recited in claim 1 further comprising code segments implementing a Structure from Motion (SfM) process.

5. A digital camera with audio, visual and motion analysis as recited in claim 1 further comprising code segments implementing a Simultaneous Localization And Mapping (SLAM) process.

6. A digital camera with audio, visual and motion analysis as recited in claim 1 further comprising code segments deriving metadata from raw input data from a plurality of sensors used to develop the digital model of the ambient environment.

7. A digital camera with audio, visual and motion analysis as recited in claim 1 further comprising a display supported by the camera body capable of displaying an image of the ambient environment.

8. A digital camera with audio, visual and motion analysis as recited in claim 7 further comprising code segments overlaying an augmented reality (AR) image over the image of the ambient environment.

9. A method for modeling an ambient environment with a digital camera comprising:
collecting raw image input data from an imaging sensor of a digital camera;
collecting raw sound data from a sound sensor of the digital camera;
deriving metadata including the synthesis of both motion signals and imaging signals from the raw image data and the raw sound data; and
processing the metadata and the raw sound data to develop a model of the ambient environment of the digital camera by an implementation of at least one of a Structure from Motion (SfM) process and a Simultaneous Localization And Mapping (SLAM) process.

10. A method for modeling an ambient environment with a digital camera as recited in claim 9 further comprising processing the raw image data during the implementation of at least one of the SfM process and the SLAM process.

11. A method for modeling an ambient environment with a digital camera as recited in claim 9 further comprising collecting raw motion data and processing the raw motion data during the implementation of at least one of the SfM process and the SLAM process.

12. A method for modeling an ambient environment with a digital camera as recited in claim 9 wherein the model includes the synthesis of both motion signals and imaging signals from the sound data alone.

13. A method for providing augmented reality with a digital camera comprising:
scanning an ambient environment with a digital camera including a sound sensor;
developing a model of the ambient environment with a digital processor of the digital camera that includes physical objects and their properties from data derived from the sound sensor; and
developing augmented reality (AR) to overlay the ambient environment.

14. A method for providing augmented reality with a digital camera as recited in claim 13 wherein developing AR comprises overlaying an AR image over an image of the ambient environment, wherein the AR image includes virtual objects with virtual properties that are related to physical properties of the ambient environment.

15. A method for providing augmented reality with a digital camera as recited in claim 13 wherein developing AR comprises overlaying AR sound over sound of the ambient environment, wherein the AR sound includes virtual objects with virtual properties that are related to physical properties of the ambient environment.

16. A method for providing augmented reality with a digital camera as recited in claim 13 further comprising implementing a Structure from Motion (SfM) process.

17. A method for providing augmented reality with a digital camera as recited in claim 13 further comprising implementing a Simultaneous Localization And Mapping (SLAM) process.

18. A method for providing augmented reality with a digital camera as recited in claim 13 further comprising a database including at least one of virtual objects with virtual properties and real objects with real properties.

19. A non-transitory computer readable medium comprising code segments executable on a digital processor of a digital camera for:
scanning an ambient environment with a digital camera including a sound sensor;
developing a model of the ambient environment with a digital processor of the digital camera that includes physical objects and their properties from data derived from the sound sensor; and
developing augmented reality (AR) to overlay the ambient environment.

20. A non-transitory computer readable medium comprising code segments executable on a digital processor of a digital camera as recited in claim 19 wherein developing AR comprises overlaying an AR image over an image of the ambient environment, wherein the AR image includes virtual objects with virtual properties that are related to physical properties of the ambient environment.

21. A non-transitory computer readable medium comprising code segments executable on a digital processor of a digital camera as recited in claim 19 wherein developing AR comprises overlaying AR sound over sound of the ambient environment, wherein the AR sound includes virtual objects with virtual properties that are related to physical properties of the ambient environment.

22. A non-transitory computer readable medium comprising code segments executable on a digital processor of a digital camera as recited in claim 19 further comprising implementing a Structure from Motion (SfM) process.

23. A non-transitory computer readable medium comprising code segments executable on a digital processor of a digital camera recited in claim 19 further comprising implementing a Simultaneous Localization And Mapping (SLAM) process.

24. A non-transitory computer readable medium comprising code segments executable on a digital processor of a digital camera as recited in claim 19 further comprising a database including at least one of virtual objects with virtual properties and real objects with real properties.

25. A non-transitory computer readable medium comprising code segments executable on a digital processor of a digital camera as recited in claim 19 wherein developing AR to overlay the ambient environment includes accelerating an AR computational process using at least one of a sensor input or a neural network.

* * * * *